(12) United States Patent
Slavens et al.

(10) Patent No.: US 10,329,923 B2
(45) Date of Patent: Jun. 25, 2019

(54) GAS TURBINE ENGINE AIRFOIL LEADING EDGE COOLING

(71) Applicant: United Technologies Corporation, Hartford, CT (US)

(72) Inventors: Thomas N. Slavens, Vernon, CT (US); Dominic J. Mongillo, Jr., West Hartford, CT (US); Matthew A. Devore, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 719 days.

(21) Appl. No.: 14/633,677

(22) Filed: Feb. 27, 2015

(65) Prior Publication Data

US 2016/0010465 A1 Jan. 14, 2016

Related U.S. Application Data (60) Provisional application No. 61/950,301, filed on Mar. 10, 2014.

(51) Int. Cl.
| | |
|---|---|
| *F01D 5/18* | (2006.01) |
| *F01D 9/04* | (2006.01) |
| *F01D 17/16* | (2006.01) |
| *F01D 5/08* | (2006.01) |

(52) U.S. Cl.
CPC ............. *F01D 5/187* (2013.01); *F01D 5/186* (2013.01); *F01D 9/041* (2013.01); *F01D 17/16* (2013.01); *F01D 5/08* (2013.01); *F01D 5/188* (2013.01); *F05D 2220/32* (2013.01); *F05D 2220/3212* (2013.01); *F05D 2240/12* (2013.01); *F05D 2240/303* (2013.01); *F05D 2260/202* (2013.01); *Y02T 50/673* (2013.01); *Y02T 50/676* (2013.01)

(58) Field of Classification Search
CPC .......... F01D 5/187; F01D 5/186; F01D 5/188; F01D 9/041; F01D 17/16; F01D 5/08
USPC ............................................. 415/116; 416/46
See application file for complete search history.

(56) References Cited

U.S. PATENT DOCUMENTS

| | | | |
|---|---|---|---|
| 5,356,265 A * | 10/1994 | Kercher | ................... F01D 5/186 416/97 R |
| 5,374,162 A | 12/1994 | Green | |
| 5,779,437 A | 7/1998 | Abdel-Messeh | |
| 6,050,777 A | 4/2000 | Tabbita et al. | |
| 6,210,112 B1 | 4/2001 | Tabbita | |
| 7,195,458 B2 * | 3/2007 | Liang | ...................... F01D 5/187 416/97 R |

(Continued)

FOREIGN PATENT DOCUMENTS

| | | |
|---|---|---|
| EP | 2236752 | 10/2010 |
| JP | S60198305 | 10/1985 |
| WO | 2015035363 | 3/2015 |

OTHER PUBLICATIONS

Extended European Search Report for Application No. 15158256.6 dated Dec. 9, 2015.

*Primary Examiner* — Justin D Seabe
*Assistant Examiner* — Behnoush Haghighian
(74) *Attorney, Agent, or Firm* — Carlson, Gaskey & Olds, P.C.

(57) ABSTRACT

An example gas turbine engine component includes an airfoil having a leading edge area, a first circuit to cool a first section of the leading edge area, and a second circuit to cool a second section of the leading edge area. The first circuit separate and distinct from the second circuit within the airfoil.

19 Claims, 7 Drawing Sheets

(56) References Cited

U.S. PATENT DOCUMENTS

| | | | |
|---|---|---|---|
| 7,520,725 B1* | 4/2009 | Liang | F01D 5/186 416/97 R |
| 8,317,473 B1 | 11/2012 | Liang | |
| 8,562,295 B1* | 10/2013 | Liang | F01D 5/14 29/889.21 |
| 2003/0044278 A1* | 3/2003 | Eneau | F01D 5/186 416/97 R |
| 2008/0273976 A1* | 11/2008 | Suciu | F01D 5/148 416/46 |
| 2009/0293495 A1 | 12/2009 | Correia et al. | |

\* cited by examiner

GAS TURBINE ENGINE AIRFOIL LEADING EDGE COOLING

CROSS-REFERENCE TO RELATED APPLICATION

This application claims priority to U.S. Provisional Application No. 61/950,301 filed on Mar. 10, 2014.

STATEMENT REGARDING GOVERNMENT SUPPORT

This invention was made with government support under Contract No. N00014-09-D-0821-0006 awarded by the United States Navy. The government has certain rights in this invention.

BACKGROUND

This disclosure relates generally to cooling within a gas turbine engine and, more particularly, to cooling leading edges of components aft of variable vanes.

Gas turbine engines are known and, typically, include a fan delivering air into a bypass duct as propulsion air and to be utilized to cool components. The fan also delivers air into a core engine where it is compressed in a compressor. The compressed air is then delivered into a combustion section where it is mixed with fuel and ignited. Products of the combustion pass downstream over turbine rotors, driving them to rotate.

Some portions of the gas turbine engine can include variable vanes. As known, adjusting the variable vanes alters flow through the gas turbine engine and can improve overall engine performance. Adjusting variable vanes alters flow to the blades aft the variable vanes, which changes the position and characteristic shape of the stagnation point along the surface. This changes the areas of the blades having the highest heat transfer coefficients.

More specifically, actuation of the variable vanes alters the inlet angle to the downstream blades can alter the stagnation location from positive incidence (pressure side stagnation location), neutral incidence (leading edge stagnation location), to negative incidence (suction side stagnation location). The heat transfer coefficients located at a stagnation point of the flow over blades downstream the variable vanes can be 1.5 to 2 times greater than the heat transfer coefficients on the other portions of the blade surface. Thus, aside from aerodynamic ramifications of this change in stagnation location, cooling the blades downstream of variable vanes becomes problematic, especially at the leading edge.

SUMMARY

A gas turbine engine component according to an exemplary aspect of the present disclosure includes, among other things, an airfoil having a leading edge area, a first circuit to cool a first section of the leading edge area, and a second circuit to cool a second section of the leading edge area, the first circuit separate from the second circuit.

In another example of the foregoing component, the first circuit and the second circuit are both contained within the airfoil.

In another example of any of the foregoing components, flow across the airfoil has an incidence angle relative to the airfoil, and the leading edge area represents an area of the airfoil traversed by a maximum stagnation point of flow across the airfoil throughout one-hundred-eighty degrees of incident angle shift.

In another example of any of the foregoing components, the airfoil is a turbine airfoil.

In another example of any of the foregoing components, the airfoil has a forward apex relative to a direction of flow across the airfoil. The forward apex extending radially along the airfoil. The first circuit and the second circuit each cooling at least some of the airfoil at the forward apex.

In another example of any of the foregoing components, the first circuit is configured to communicate air to a radially inner portion of the forward apex, and the second circuit is configured to communicate air to a radially outer portion of the forward apex.

In another example of any of the foregoing components, the first circuit and the second circuit are configured to receive flow from a radially inner end of the airfoil.

In another example of any of the foregoing components, the second circuit comprises a serpentine cooling circuit.

In another example of any of the foregoing components, the airfoil includes at least two other cooling circuits.

A gas turbine engine according to an exemplary aspect of the present disclosure includes, among other things, a airfoil, a variable vane array upstream from the airfoil, a compressed air supply, a first circuit within the airfoil to cool a leading edge area of the airfoil, and a second circuit within the airfoil to cool a leading edge area of the airfoil.

In another example of the foregoing gas turbine engine, the airfoil is a turbine airfoil.

In another example of the foregoing gas turbine engine, the turbine airfoil is in a first stage of a turbine section of the gas turbine engine.

In another example of the foregoing gas turbine engine, flow across the airfoil has an incidence angle relative to the airfoil, and the leading edge area represents an area of the airfoil traversed by a maximum stagnation point of flow across the airfoil through one-hundred-eighty degrees of incident angle shift.

In another example of the foregoing gas turbine engine, wherein the airfoil has a forward apex relative to a direction of flow across the airfoil, the forward apex extending radially along the airfoil, and the first circuit and the second circuit each cooling at least some of the airfoil at the forward apex.

In another example of the foregoing gas turbine engine, the first circuit is separate and distinct from the second circuit.

A method of cooling an airfoil according to an exemplary aspect of the present disclosure includes, among other things, communicating a cooling flow to a leading edge area of a airfoil through both a first cooling circuit and a second cooling circuit that is separate and distinct from the first cooling circuit within the airfoil.

In another example of the foregoing method, flow across the airfoil has an incidence angle relative to the airfoil, and the leading edge area represents an area of the airfoil traversed by a maximum stagnation point of flow across the airfoil through one-hundred-eighty degrees of incident angle shift.

In another example of any of the foregoing methods, the method includes communicating the cooling flow from both the first circuit and the second circuit to a forward apex of the airfoil, the forward apex extending radially along the airfoil.

In another example of any of the foregoing methods, the first circuit is separate and distinct from the second circuit.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
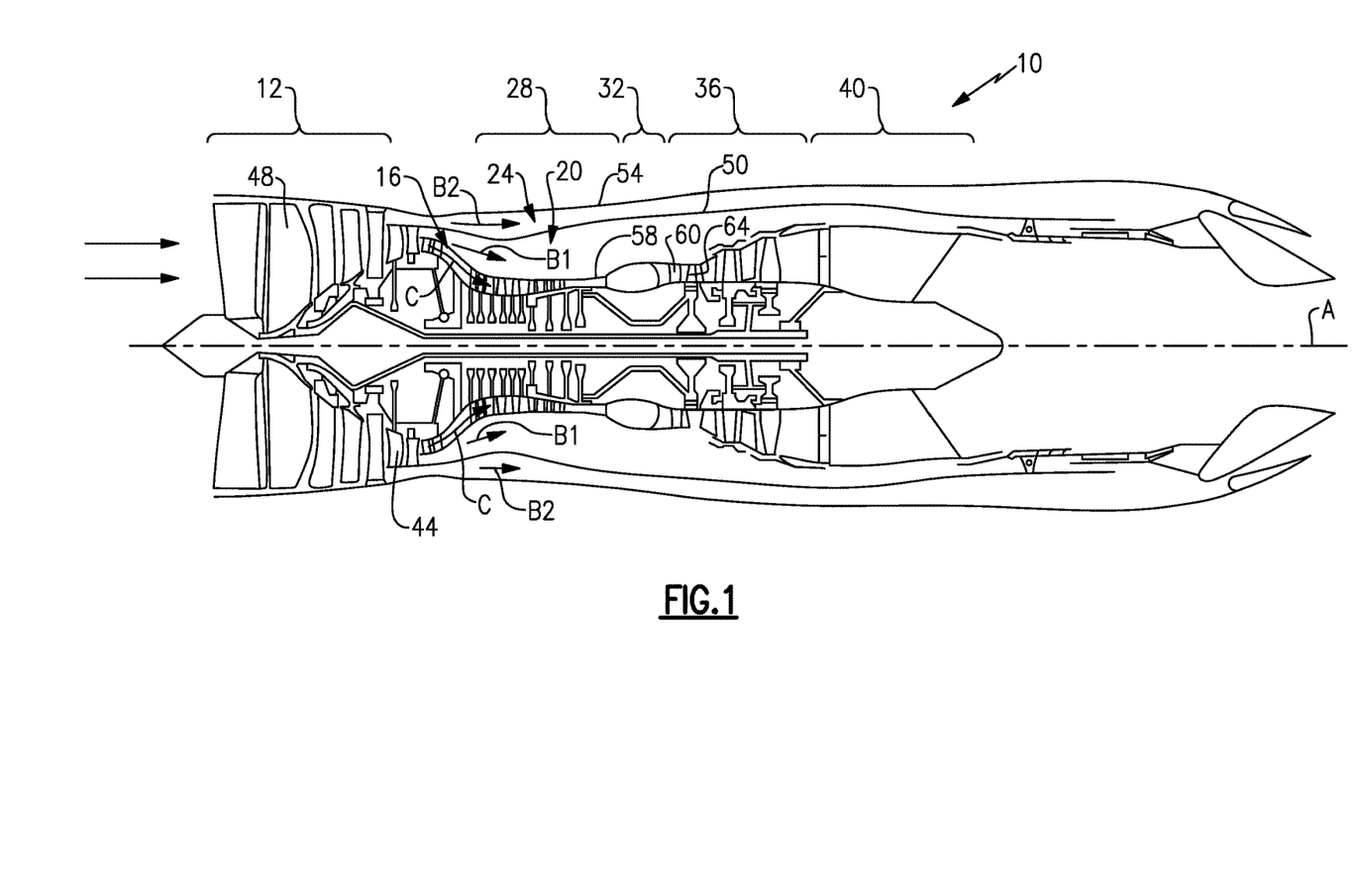
FIG. 1 schematically shows a multiple bypass stream gas turbine engine.

FIG. 1 shows an exemplary engine 10 in a schematic manner. A fan section 12 delivers air into a core engine 16, a radially inner bypass passage 20, and a radially outer bypass passage 24.

A core flow C of air is delivered to the core engine 16 from the fan section 12 and moves along a core flow passage 26 extending through a compressor section 28, a combustor section 32, a turbine section 36, and then outwardly of a nozzle 40. Compressed air from the compressor section 28 is mixed with fuel and ignited in the combustor section 32. The products of combustion drive turbine rotors in the turbine section 36 to rotatably drive compressor rotors in the compressor section 28, and fan rotors 44 and 48 about an axis A.

The fan rotor 44 supplies air to the main bypass flow B1 and the core flow C. The main bypass flow B1 flows through the radially inner bypass passage 20 inwardly of a main bypass flow outer housing 50, and outwardly of a core engine outer housing 58.

The fan rotor 48 provides air to the main bypass flow B1, the core flow C, and a third stream bypass flow B2. The third stream bypass flow B2 flows through a radially outer bypass passage 24 that is defined inwardly of an outer housing 54 and radially outwardly of the main bypass outer housing 50.

The example engine 10 includes an array of variable area turbine vanes 60 at an inlet to the turbine section 36 of the engine 10. The array 60 provides an adaptive component, which can be selectively coupled with other adaptive components of the engine 10, such as fans within the fan section 12, variable area compressor vane arrays, variable nozzles, etc.

The vanes within the variable turbine vane array 60 are adjusted to alter flow exiting the combustor section 32 to the turbine section 36. The example vane array 60 is located at a first stage of the high pressure turbine within the turbine section. In another example, the array may be located elsewhere within the turbine section 36, such as at a first stage of a low pressure turbine of the turbine section.

The turbine section 36 may include arrays of variable turbine vanes in addition to the variable turbine vane array 60. These additional arrays can be located at other stages of the high pressure turbine, the low pressure turbine, or both.

Figure 2:
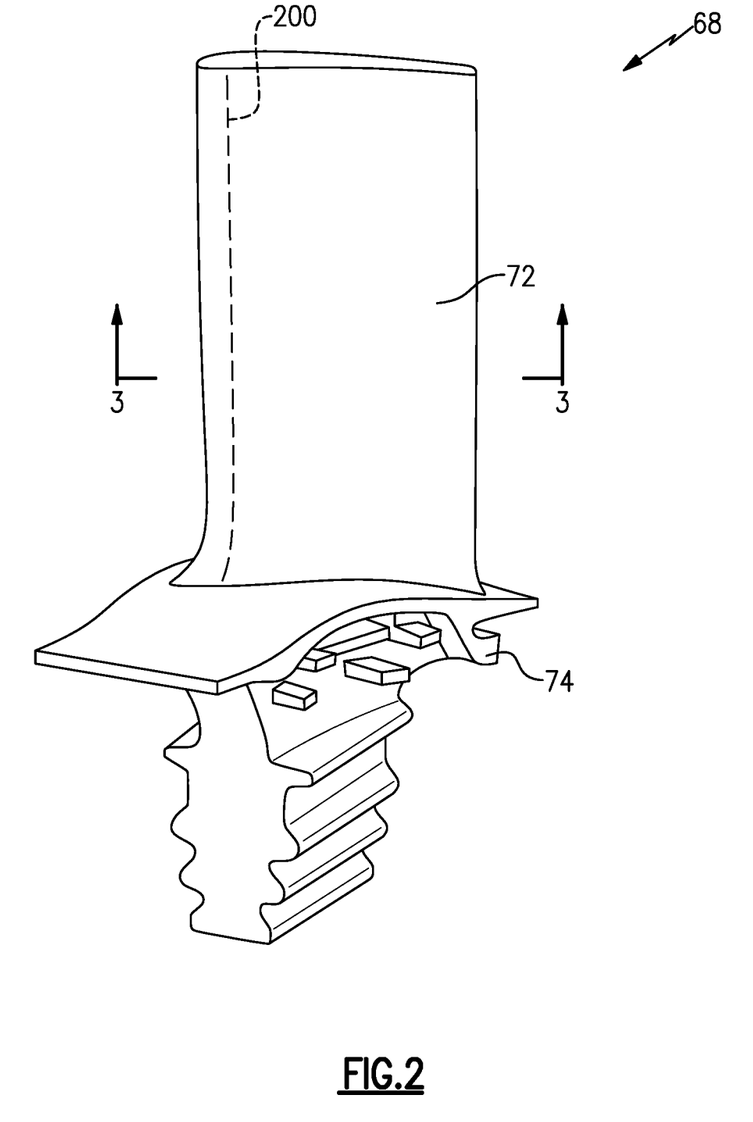
FIG. 2 illustrates an example blade from a first stage of a high pressure turbine section of the engine of FIG. 1.
Figure 3:
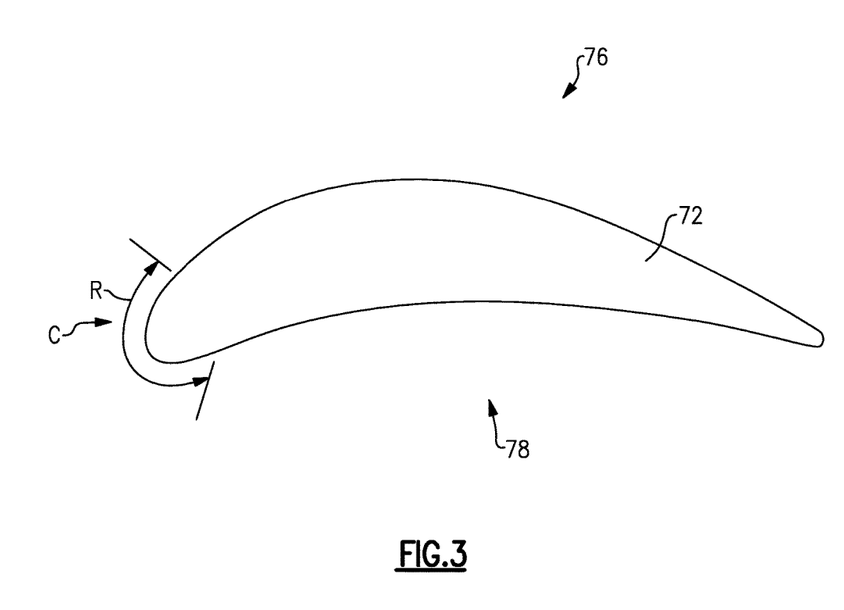
FIG. 3 illustrates a schematic section view at line 3-3 in FIG. 2.

Referring now to FIGS. 2-3 with continuing reference to FIG. 1, a blade array 64 is downstream from the variable turbine vane array 60. The blade array 64 includes a plurality of individual blades 68 distributed annularly about the axis A. Each blade 68 includes an airfoil 72 extending from a base 74. The airfoil 72 includes a suction side 76 and a pressure side 78.

A maximum stagnation point 80 represents a point on an outer perimeter 70 of the airfoil 72 where flow C splits and moves over the suction side 76 or the pressure side 78. Adjusting the variable turbine vane array 60 can adjust flow to the blade 68. Varying flow to the blade 68 can change a position of the stagnation point 80. The stagnation point 80 can vary based on the positioning of the variable vane array 60. Thus, adjusting the variable vane array 60 can change the position of the stagnation point 80 associated with the blade 68.

Figure 4A:
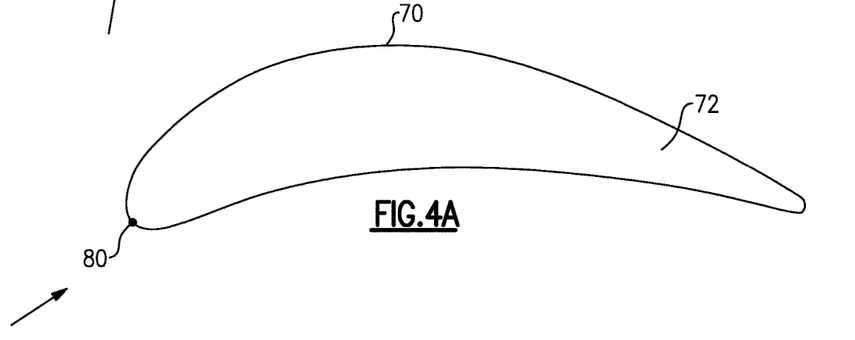
FIG. 4A illustrates a stagnation point of flow across the section of FIG. 3 when the flow has a neutral incidence angle.
Figure 4B:
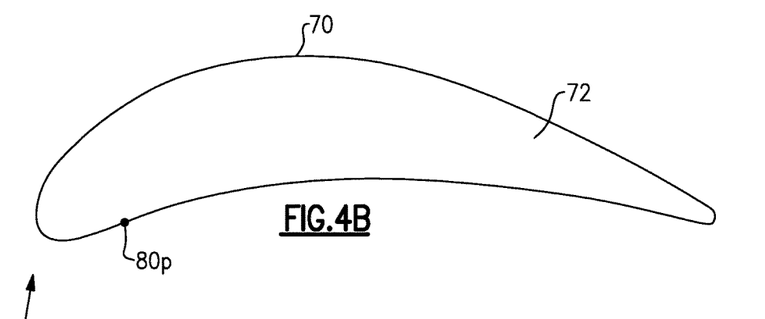
FIG. 4B illustrates a stagnation point of flow across the section of FIG. 3 when the flow has a positive incidence angle.
Figure 4C:
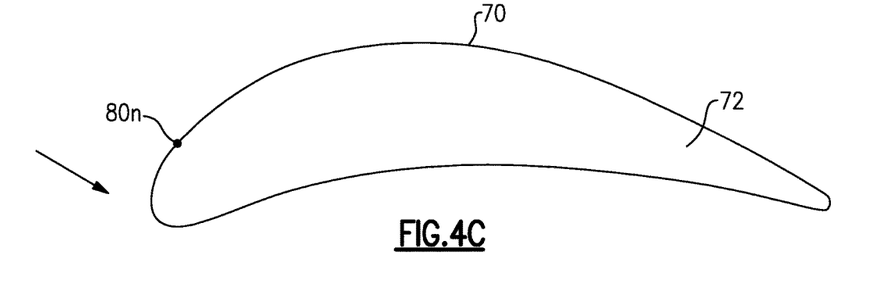
FIG. 4C illustrates a stagnation point of flow across the section of FIG. 3 having a negative incidence angle.

Referring to FIGS. 4A-4C, adjusting the variable turbine vane array 60 can change the incidence angle of flow C moving toward the variable turbine vane array 60.

When the variable turbines of array 60 are in a neutral position, the array 60 guides flow having a neutral incidence angle toward the airfoil 72. When the variable turbines of array 60 are in the neutral position, a maximum stagnation point 80 of the flow is at the position shown FIG. 4A.

Moving the variable turbines of array 60 in first direction to a position causes the flow moving toward the airfoil 72 to have a positive incidence angle, as shown in FIG. 4B. When the flow has the positive incidence angle shown in FIG. 4B, the maximum stagnation point 80$p$ of the flow is at the position shown in FIG. 4B.

Moving the variable turbines of array 60 in a second direction, opposite the first direction, to a position causes the flow moving toward the airfoil 72 to have a negative incidence angle, as shown in FIG. 4C. When the flow has the negative incidence angle shown in FIG. 4C, the maximum stagnation point 80$n$ of the flow is at the position shown in FIG. 4B.

In this example, the positive incidence angle of FIG. 4B is shifted one-hundred-eighty degrees from the negative incidence angle of FIG. 4C. Thus, the maximum stagnation point 80$p$ of FIG. 4B and the maximum stagnation point 80$n$ of FIG. 4C bound a range R of possible stagnation points 80 for flow moving across the airfoil 72 throughout one-hundred-eighty degrees of incident angle shift.

Figure 5:
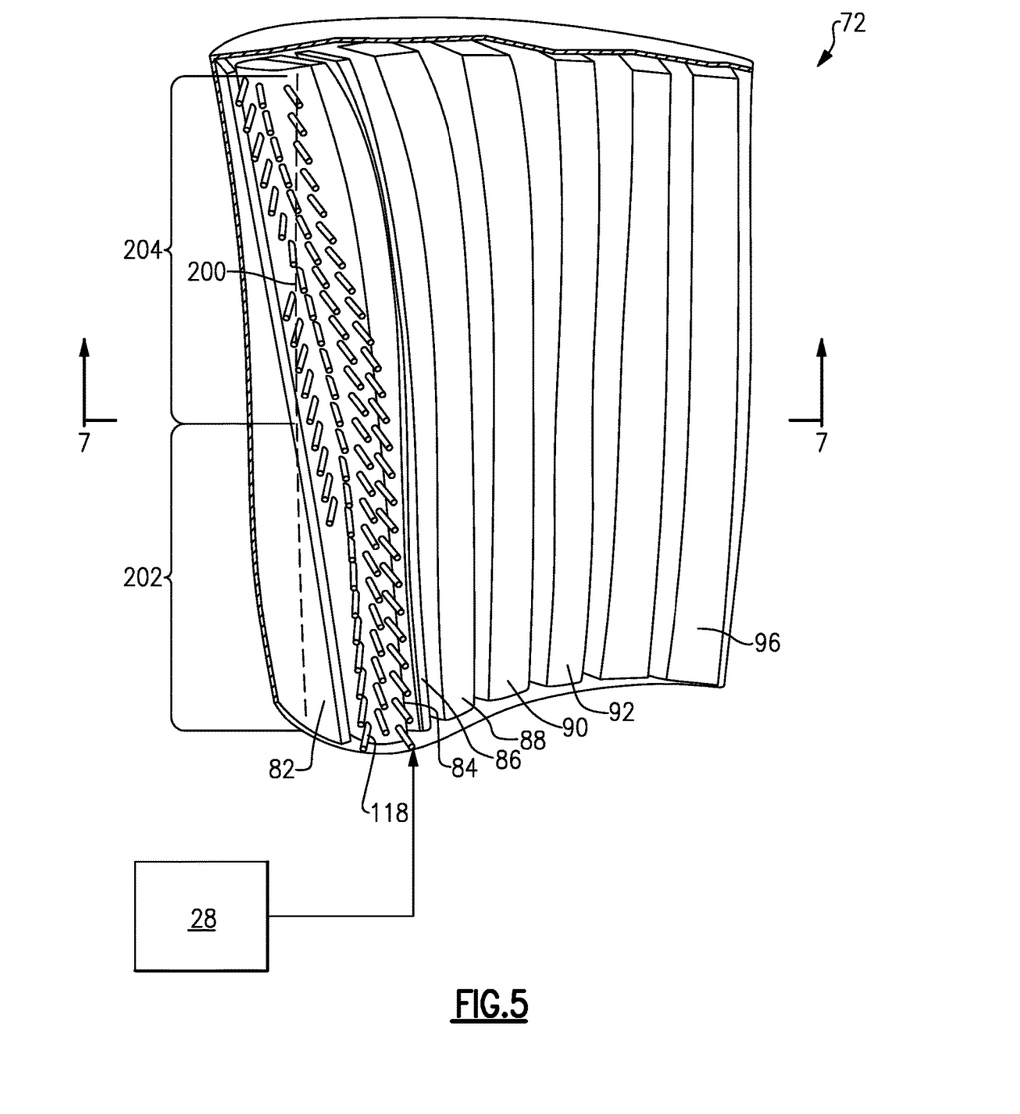
FIG. 5 illustrates a section view of an airfoil of the blade of FIG. 2.
Figure 6:
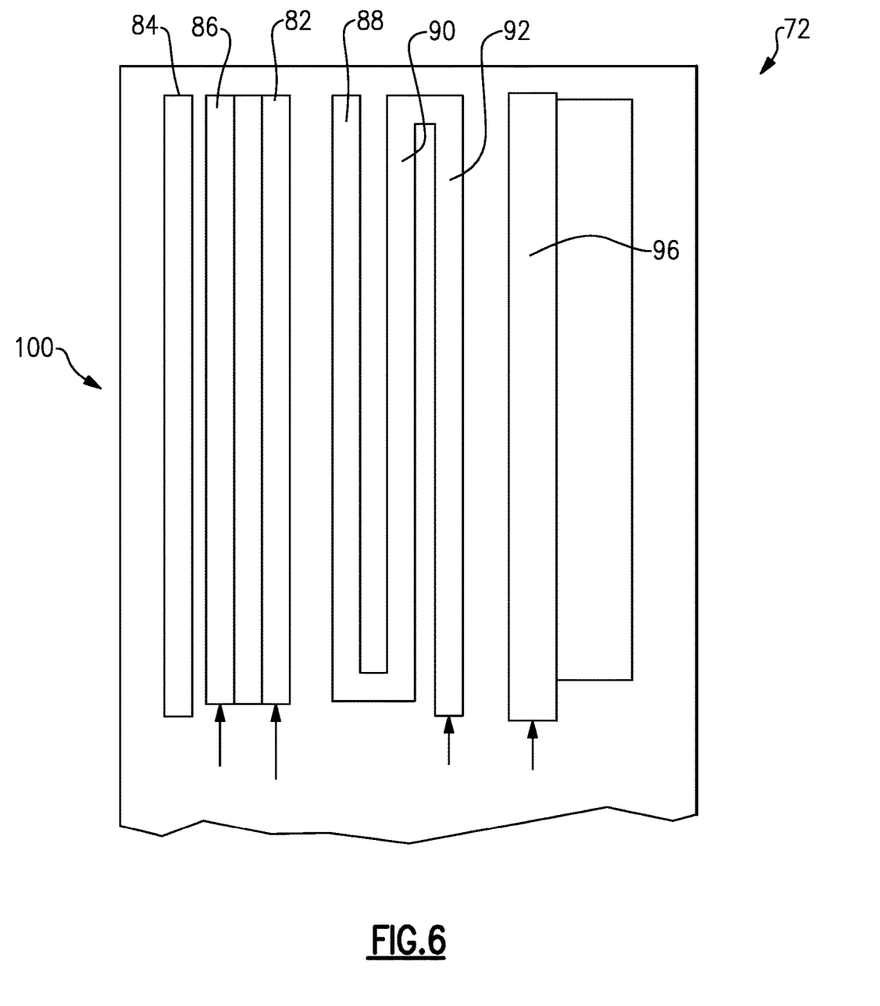
FIG. 6 illustrates a highly schematic view of flow moving through cavities in the airfoil of FIG. 5.
Figure 7:
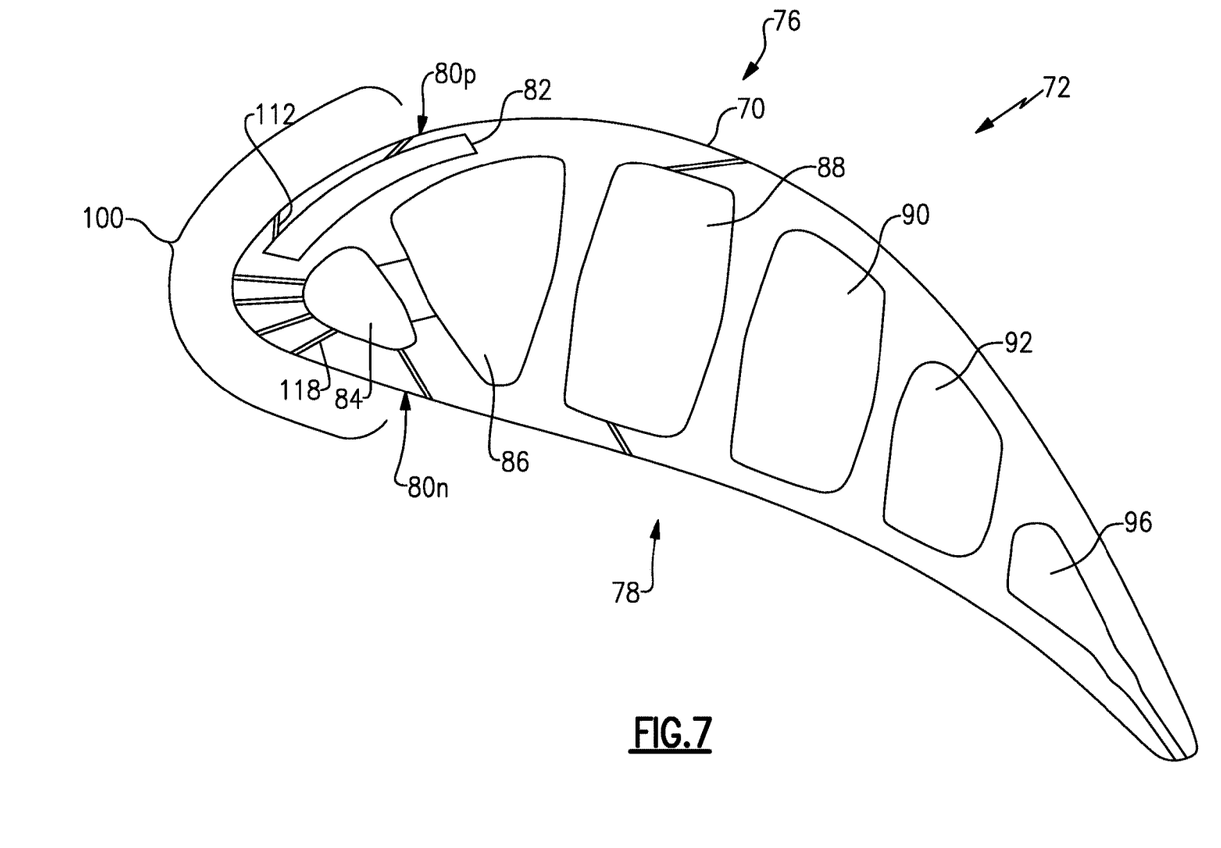
FIG. 7 illustrates a schematic section view at line 3-3 in FIG. 2 showing the cavities.

Referring now to FIGS. 5-7 with continued reference to FIGS. 2-4B, the example blade 68 includes multiple cooling cavities on one of four separate cooling circuits. A first cooling cavity 82 is on a first cooling circuit. A second cooling cavity 84 and a third cooling cavity 86 are on a second cooling circuit. A fourth cooling cavity 88, a fifth cooling cavity 90, and a sixth cooling cavity 92 are on a third cooling circuit. A seventh cooling cavity 96 is on a fourth cooling circuit.

In this disclosure, if cavities are on the same cooling circuit, flow can communicate between those cavities within the airfoil 72. Similarly, if cavities are not on the same cooling circuit, flow does not communicate between those cavities within the airfoil 72.

Since the first cavity 82 is on a separate cooling circuit from the second and third cooling cavities 84 and 86, flow moving through the first cavity 82 is not free to move to the cavities 84 or 86, and vice versa.

In this example, both the first cavity 82 and the second cavity 84 are used to cool a leading edge area 100 of the airfoil 72. The leading edge area 100 is the portion of the airfoil 72 traversed by a maximum stagnation point of flow across the airfoil 72 throughout the one-hundred-eighty degrees of incident angle shift.

Both the first circuit and the second circuit cool at least some of the airfoil 72 at the leading edge area 100. The first circuit cools a radially inner portion and the second circuit cools a radially outer portion. Thus, two circuits are used to cool the example leading edge area 100. In another example, more than two circuits are used.

On the suction side 76 of the airfoil 72, the stagnation point 80*p* represents a first boundary of the leading edge area 100. On the pressure side 78, the stagnation point 80*n* represents an opposing section boundary of the leading edge area 100. The boundaries of the leading edge area 100 at the suction side 76 and pressure side 78 at a given radial section of the airfoil 72 are dictated by the maximum stagnation points when flow is moving across the airfoil in the directions of FIGS. 4B and 4C. Thus, the positions of the boundaries of the leading edge area 100 may fluctuate axially along the suction side 76 and the pressure side 78 at different radial heights of the airfoil 72.

In this example, air moves from the first cavity 82, through film holes 112, to the leading edge area 100. The film holes 112 are arranged in radial rows. The film holes 112 cover an area of the airfoil 72 spanning from the negative twenty degrees to negative sixty-five degrees away from the nominal stagnation point 80. The nominal stagnation point 80 is the location on the leading edge where the incidence angle into the blade has the highest aerodynamic efficiency. This negative range of incidence angles induce an external boundary regime in which a high pressure bubble accumulates in the region bounded by rows 112. Conversely, across the airfoil thickness on the pressure side of the airfoil a low pressure bubble is created. The independence of cooling circuits 82 and 86 ensure that hot gas does not migrate through the airfoil from the high pressure bubble to low pressure bubble.

The second cavity 84 is an impingement cavity to convectively cool the leading edge area 100 of the airfoil 72. Air moves from the second cavity 84, through film holes 118 to the leading edge area 100. The film holes 118 are arranged in radial rows of showerhead holes spanning an angle of roughly twenty degrees on the suction side 76 and up to fifty degrees on the pressure side 78 of the nominal stagnation point 80.

The number of cooling rows of film holes 112 and film holes 118 is application dependent, being added to or deleted from depending on the intended duty cycle of the overall engine 10. The first cavity 82 is designed such that chamber Mach numbers are kept low enough as to retain positive outflow margin from the film holes 118 during negative incidence operation. This design implementation permits an increase in the number of rows of film holes 112 without a general redesign of the internal airfoil cores or casting.

The first cavity 82 and the film holes 112 together provide portions of a first cooling circuit within the airfoil 72. The second cavity 84 and the film holes 118 together provide portions of a second cooling circuit within the airfoil 72. Within the airfoil, the first cooling circuit is separate and distinct from the second cooling circuit.

A stage of the compressor section 28 supplies air to the first and second circuits in this example. The flow is provided to the first and second circuits at a radially inner end of the airfoil 72.

In this example, the static pressures of the cavities 82 and 84 of the first and second circuits have a back flow margin which allows up to 500 psia swings in external static pressure. These that supply cooling air to the plurality of hole rows within the leading edge region possess a backflow margin that allows up to 500 psia (3447 kPa) swings in external static pressure. Backflow margin is the ratio of internal to external pressure on an airfoil. These swings in static pressures are a result of the change in stagnation region as the vanes in the array 60 open or close.

In this example, the second cavity 84 and third cavity 86 may follow a serpentine cooling path. The second circuit is thus considered serpentine in this example.

Other areas of the airfoil 72 may utilize a forward flowing serpentine cooling circuits that terminate aft of the cavities 82, 84 with the final flow being in the radially outward direction.

The number of cavities within the airfoil 72 can depend on the airfoil chord length and overall operation of the engine 10. More aggressive and hotter core engines would utilize five to seven pass serpentine and conventional configurations leveraging a three pass serpentine.

Cavities aft the second cavity 84 can be utilized to feed pressure side rows of film cooling holes, suction side rows of film cooling holes, or both. These rows can be utilized to add gross cooling to the midsides of the airfoil 72 and, as such, leverage shaping or diffusing as dictated by the external flowpath.

The seventh cavity 96, the aftmost cavity, can be a radial up flowing trailing edge feed cavity feeding a trailing edge center discharge slot.

With specific reference to FIGS. 2 and 5, an apex reference line 200 extends radially along the airfoil 72. The apex reference line 200 represents a forwardmost point of the airfoil 72 relative to a direction of flow. The apex reference line 200 is within the leading edge area 100.

Both the first circuit and the second circuit cool at least some of the airfoil 72 at the apex reference line 200. In this example, the first circuit cools a radially inner portion 202 and the second circuit cools a radially outer portion 204. Two circuits are used to cool the apex reference line in this example. In another example, more than two circuits are used.

Features of at least some of the disclosed examples include utilizing a multicavity design to feed a plurality of cooling holes ranging across a stagnation traverse region of an airfoil. Due to the large changes in external static pressures with the changes with incidence angle, the multicavity design leverages cavities designed with increased static outflow margin.

The disclosed examples may result in increased engine efficiency through a robust cooling configuration that is tolerant to traverses in stagnation point and large swings in external static pressures. Further, some examples mitigate the risk of hot gas ingestion during stagnation traverse across the leading edge of the airfoil.

The divorced cavity design ensures, in some examples, that flow redistribution due to external pressure changes does not significantly reduce section specific cooling effectiveness. Microchannel cooled leading edge region ensures high convective efficiency over large portion of the stagnation region.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A gas turbine engine component, comprising:
    an airfoil having a leading edge area that corresponds to a stagnation traverse region of the airfoil;
    a first circuit to cool a first section of the leading edge area; and
    a second circuit to cool a second section of the leading edge area, the first circuit separate and distinct from the second circuit within the airfoil.

2. The component of claim 1, wherein the first circuit and the second circuit are both contained within the airfoil.

3. The component of claim 1, wherein flow across the airfoil has an incidence angle relative to the airfoil, and the leading edge area represents an area of the airfoil traversed by a maximum stagnation point of flow across the airfoil through one-hundred-eighty degrees of incident angle shift.

4. The component of claim 1, wherein the airfoil is a turbine airfoil.

5. The component of claim 1, wherein the airfoil has a forward apex relative to a direction of flow across the airfoil, the forward apex extending radially along the airfoil, and the first circuit and the second circuit each cooling at least some of the airfoil at the forward apex.

6. The component of claim 5, wherein the first circuit is configured to communicate air to a radially inner portion of the forward apex, and the second circuit is configured to communicate air to a radially outer portion of the forward apex.

7. The component of claim 1, wherein the first circuit and the second circuit are configured to receive flow from a radially inner end of the airfoil.

8. The component of claim 1, wherein the second circuit comprises a serpentine cooling circuit.

9. The component of claim 1, wherein the airfoil includes at least two other cooling circuits.

10. A gas turbine engine, comprising:
    an airfoil;
    a variable vane array upstream from the airfoil;
    a first circuit within the airfoil to cool a leading edge area of the airfoil; and
    a second circuit within the airfoil to cool a leading edge area of the airfoil, wherein the leading edge area corresponds to a stagnation traverse region of the airfoil.

11. The gas turbine engine of claim 10, wherein the airfoil is a turbine airfoil.

12. The gas turbine engine of claim 11, wherein the turbine airfoil is in a first stage of a turbine section of the gas turbine engine.

13. The gas turbine engine of claim 10, wherein flow across the airfoil has an incidence angle relative to the airfoil, and the leading edge area represents an area of the airfoil traversed by a maximum stagnation point of flow across the airfoil through one-hundred-eighty degrees of incident angle shift.

14. The gas turbine engine of claim 10, wherein the airfoil has a forward apex relative to a direction of flow across the airfoil, the forward apex extending radially along the airfoil, and the first circuit and the second circuit each cooling at least some of the airfoil at the forward apex.

15. The gas turbine engine of claim 10, wherein the first circuit is separate and distinct from the second circuit.

16. A method of cooling an airfoil, comprising:
    communicating a cooling flow to a leading edge area of an airfoil through both a first cooling circuit and a second cooling circuit that is separate and distinct from the first cooling circuit within the airfoil, the leading edge area corresponding to a stagnation traverse region of the airfoil.

17. The method of claim 16, wherein flow across the airfoil has an incidence angle relative to the airfoil, and the leading edge area represents an area of the airfoil traversed by a maximum stagnation point of flow across the airfoil through one-hundred-eighty degrees of incident angle shift.

18. The method of claim 16, further comprising communicating the cooling flow from both the first circuit and the second circuit to a forward apex of the airfoil, the forward apex extending radially along the airfoil.

19. The method of claim 16, wherein the first circuit is separate and distinct from the second circuit.

* * * * *